United States Patent [19]

DuBroff

[11] Patent Number: 4,500,976

[45] Date of Patent: Feb. 19, 1985

[54] SEISMIC EXPLORATION

[75] Inventor: Richard E. DuBroff, Bartlesville, Okla.

[73] Assignee: Phillips Petroleum Company, Bartlesville, Okla.

[21] Appl. No.: 385,754

[22] Filed: Jun. 7, 1982

[51] Int. Cl.³ .............................................. G01V 1/00
[52] U.S. Cl. ........................................ 367/48; 367/43; 367/190; 455/209
[58] Field of Search ...................... 367/43, 47, 48, 190, 367/21, 46, 123, 125; 181/108, 112, 122; 455/42, 139, 205, 207, 209, 260, 276; 337/43; 329/122; 343/368, 455

[56] References Cited

U.S. PATENT DOCUMENTS

| | | | |
|---|---|---|---|
| 2,661,464 | 12/1953 | Wolf | 340/15 |
| 2,923,367 | 2/1960 | Cox | 181/0.5 |
| 3,039,094 | 6/1962 | Anderson | 343/368 |
| 3,140,490 | 7/1964 | Sichak et al. | 343/368 |
| 3,163,844 | 12/1964 | Martin | 367/135 |
| 3,252,541 | 5/1966 | Broding | 181/0.5 |
| 3,292,177 | 12/1966 | Brightman et al. | 343/455 |
| 3,342,283 | 9/1967 | Pound | 181/0.5 |
| 3,344,881 | 10/1967 | White | 181/0.5 |
| 3,348,152 | 10/1967 | Laughlin, Jr. et al. | 455/139 |
| 3,356,989 | 12/1967 | Autrey | 367/135 |
| 3,472,334 | 10/1969 | Snodgrass | 181/0.5 |
| 3,529,282 | 9/1970 | Brown et al. | 340/15.5 |
| 3,597,727 | 8/1971 | Judson et al. | 340/15.5 |
| 3,638,176 | 1/1972 | White | 340/15.5 MC |
| 3,689,873 | 9/1972 | Weller | 340/15.5 TD |
| 3,761,874 | 9/1973 | Landrum, Jr. | 367/190 |
| 3,873,958 | 3/1975 | Whitehouse | 367/135 |
| 3,889,229 | 6/1975 | Kostelnicek et al. | 367/48 |
| 4,170,766 | 10/1979 | Pridham et al. | 367/135 |
| 4,176,354 | 11/1979 | Hsiao et al. | 343/17.7 |
| 4,367,542 | 1/1983 | DuBroff | 367/128 X |

OTHER PUBLICATIONS

Andrew C. Dibble, Jr., "Phase Shift Array, Arbitrary and Continuous Through 360°", NASA Tech. Briefs, Fall 1978.
George D. Doland, "Control of Small Phased-Array Antennas", NASA Tech. Briefs, Summer 1978.
Milton H. Aronson, "Low-Level Measurements-8 Lock-in and Carrier Amplifiers", Measurements and Data Corp., 1977.

Primary Examiner—Nelson Moskowitz
Assistant Examiner—Brian Steinberger
Attorney, Agent, or Firm—French and Doescher

[57] ABSTRACT

In a seismic exploration system, the waveforms provided from a plurality of seismic sources are phase shifted so as to maximize the strength of signals received by a plurality of seismic receivers and the signals output from the plurality of seismic receivers are phase shifted so as to substantially maximize the strength of the composite signal which results from the summation of the output from the plurality of seismic receivers.

4 Claims, 10 Drawing Figures

SEISMIC EXPLORATION

This invention relates to seismic exploration. In one aspect, this invention relates to method and apparatus for enhancing the summation of data received at a plurality of seismic receivers from a plurality of seismic sources.

The drawings will be utilized to provide background information concerning the present invention and also to provide a detailed description of the present invention. A brief description of the drawings is as follows.

Figure 1:
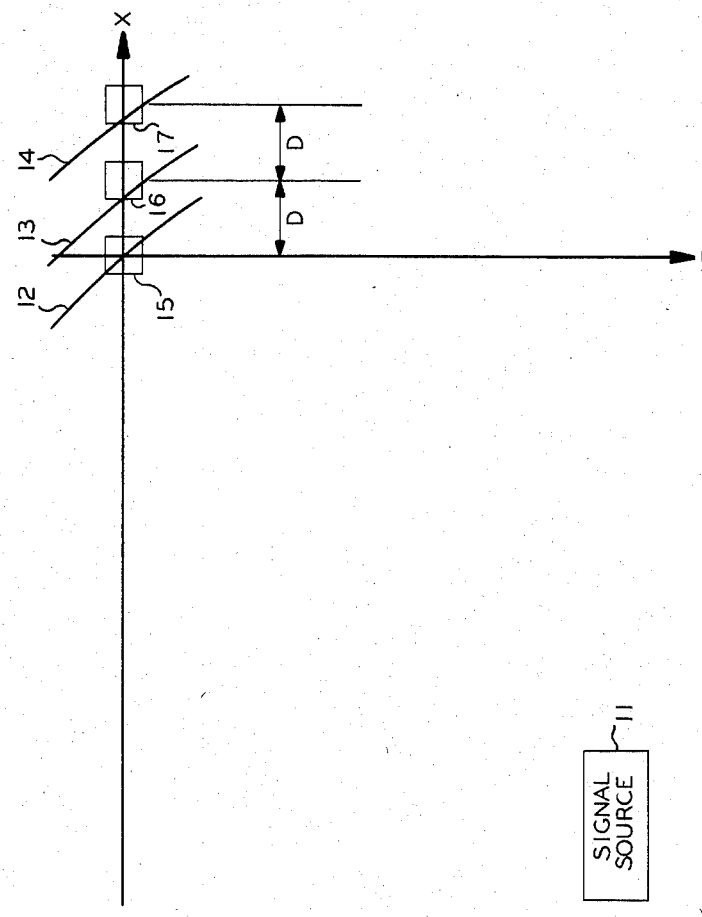
FIG. 1 is a general representation of the propagation of wavefronts from a signal source to a plurality of receivers.

Referring now to FIG. 1, there is illustrated a seismic source 11 which, for the present invention, could be a reflective boundary capable of reflecting seismic signals. Wavefronts are created as a natural consequence of the impact of seismic signals on the reflective boundary which is illustrated as signal source 11.

Three wavefronts 12–14 are illustrated in FIG. 1, but it should be understood that: (a) with the passage of time, the wavefronts 12–14 will recede away from the signal source 11; (b) each wavefront shown in FIG. 1 represents a small segment of the actual wavefront which will generally be continuous and similar in form to the ripple created by dropping a stone into water.

The wavefronts 12–14 are received by a plurality of receivers 15–17, the receivers being separated by a distance increment of D along the X direction. For the sake of simplicity, the receivers 15–17 have been illustrated as having identical elevations (Z-coordinates).

The classical plane wave may be described by the form:

$$\cos[\Omega t - k_x X - k_z Z] \qquad (1)$$

where $\Omega$ = frequency of the wave;
t = time;
k = wavenumber;
$k_x$ = horizontal wavenumber component;
$k_z$ = vertical wavenumber component; and
(X,Z) = positional coordinate with reference to some origin.

A wavefront which is said to be associated with waves of the form of Equation (1) consists of those combinations of X, Z, and t for which the argument of Equation (1)—that is, $\Omega t - k_x X - k_z Z$, is constant with different constants corresponding directly to different wavefronts.

When the separation increment, D, becomes sufficiently small in comparison to the distance separation between the signal source 11 and the receivers 15–17, the wavefronts which are incident upon the plurality of receivers may, for practical purposes, be regarded as being the wavefronts for a classical plane wave of the form of Equation (1). For the receivers illustrated in FIG. 1, Z is equal to 0, and Equation (1) reduces to $$\cos[\Omega t - k_x X] \qquad (2)$$

Assuming that receiver 15 is in the reference X position such that X equals 0 for receiver 15, the wavefront 12 seen by the receiver 15 will have the form $$\cos \Omega t \qquad (3)$$

At the same time, the wavefront 13 seen by receiver 16 will have the form $$\cos[\Omega t - k_x D] \qquad (4)$$

and the wavefront 14 seen by receiver 17 will have the form $$\cos[\Omega t - 2k_x D] \qquad (5)$$

As can be seen from Equations (3), (4) and (5), the wavefront 13 will be out of phase with the wavefront 12 by $k_x D$ and in like manner the wavefront 14 will be out of phase with the wavefront 13 by $k_x D$.

Figure 2:
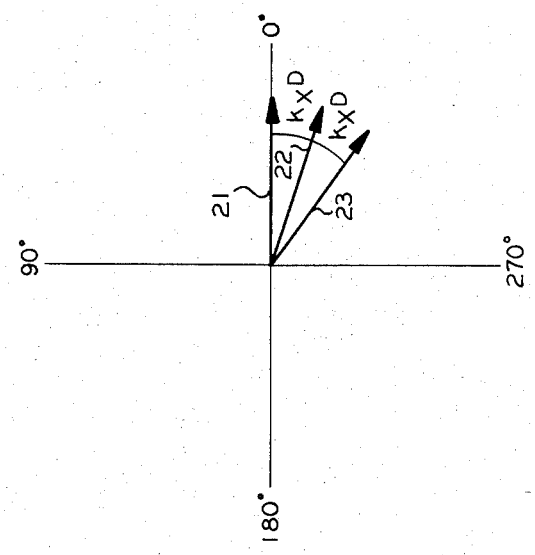
FIG. 2 is a phasor illustration of the signals which would be provided from the receivers 15–17 illustrated in FIG. 1.

A phasor illustration of the signals which would be provided from the receivers 15–17 is illustrated in FIG. 2. Phasor 21 is representative of the output from receiver 15. In like manner, phasors 22 and 23 are representative of the output from receivers 16 and 17, respectively. It is assumed that all of the output signals have the same magnitude but, as illustrated in FIG. 2, the output signals would have different phases which are illustrated as angles in the phasor representation of FIG. 2.

Figure 3:
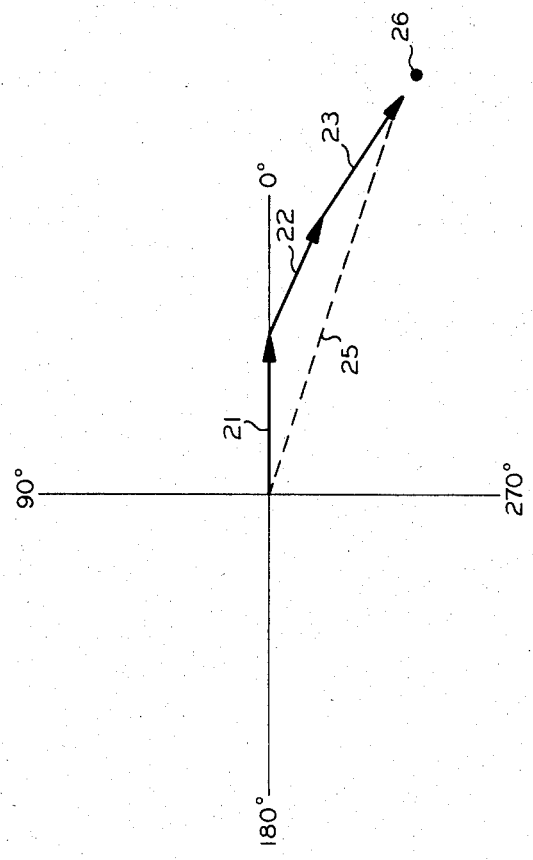
FIG. 3 is a phasor summation of the output signals illustrated in FIG. 2.

A plurality of receivers are often utilized in seismic exploration to monitor waves. The output from the various receivers are summed to provide an enhanced signal. This is particularly advantageous when the received signals are weak as is generally the case for seismic exploration. A phasor summation of the output signals from the receivers 15–17, which are illustrated in FIG. 2, is illustrated in FIG. 3. It can be seen that the resultant phasor 25 has a much larger magnitude than any one of the phasors 21, 22 and 23. However, if a phase offset of $-2K_x D$ were applied to the output of receiver 15 and a phase offset of $-k_x D$ were applied to the output of receiver 16, then the resultant phasor provided by the summation of the output of receivers 15, 16 and 17 would extend to point 26 illustrated in FIG. 3. The summation of the output of the receivers would have a greater magnitude and would be enhanced with respect to the summation of the receivers output without applying a phase shift.

It is noted that precise phase shifts cannot always be applied. Thus, while the present application refers to precise phase shifts and making phase angles equal, it should be understood that the phase angles will in general be substantially equal. Perfect equality will generally not be attainable.

It should also be noted that the following discussion regards the propagation of seismic waves as adequately characterized, in most cases, by plane waves.

Figure 4:
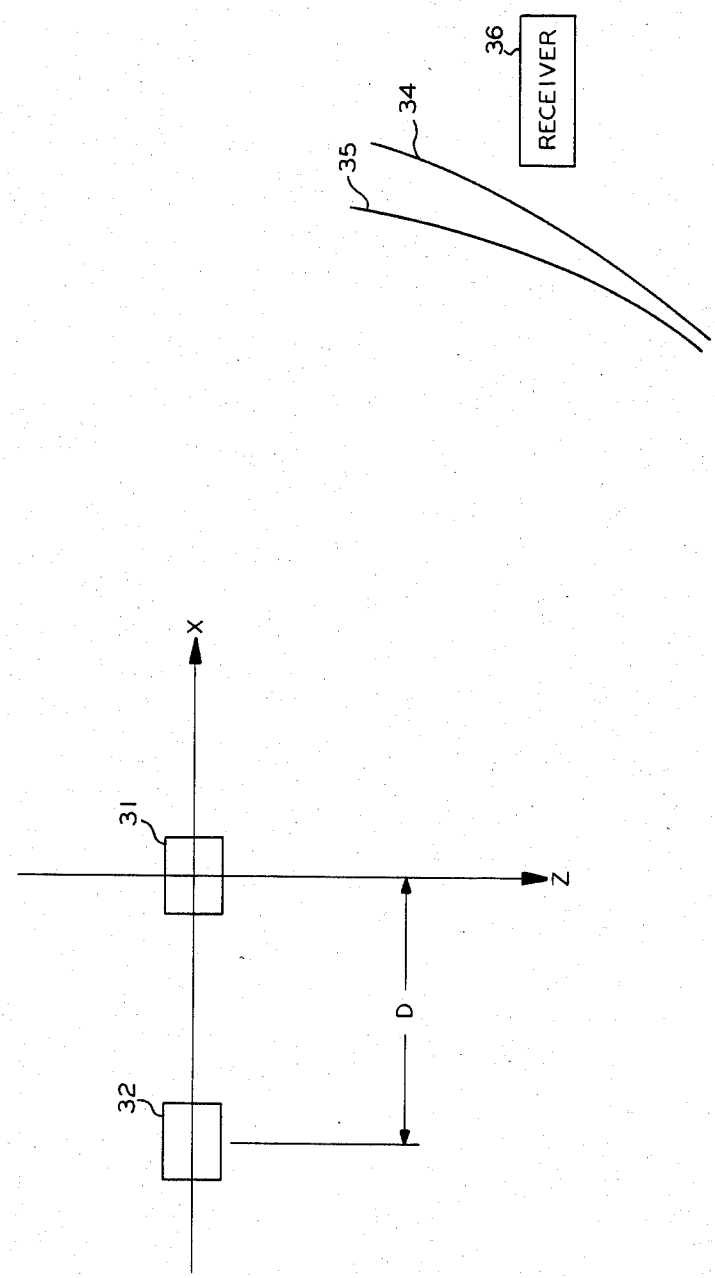
FIG. 4 is a general representation of the propagation of wavefronts from a plurality of signal sources to a single receiver.

Referring now to FIG. 4, there is illustrated a plurality of seismic sources 31 and 32 such as typical Vibroseis ® units. Two wavefronts 34 and 35 are illustrated in FIG. 4 with wavefront 34 being provided from seismic source 31 and wavefront 35 being provided from seismic source 32. The wavefronts 34 and 35 are subject to the same conditions and considerations as the wavefronts 12-14 illustrated in FIG. 1.

The wavefronts 34 and 35 are shown as being incident upon the single receiver 36. For the purpose of the present invention, receiver 36 may well represent a reflective seismic surface. If it is therefore presumed that the wavefront 34 as seen by receiver 36 will have the form $$\cos \Omega t. \quad (6)$$

then the wavefront, 35, as seen by receiver 31 will have the form $$\cos (\Omega t - k_x D). \quad (7)$$

Thus, as was the case with wavefronts 12, 13 and 14 illustrated in FIG. 1, the wavefront 35 will be out of phase with the wavefront 34 by $k_x D$.

Figure 5:
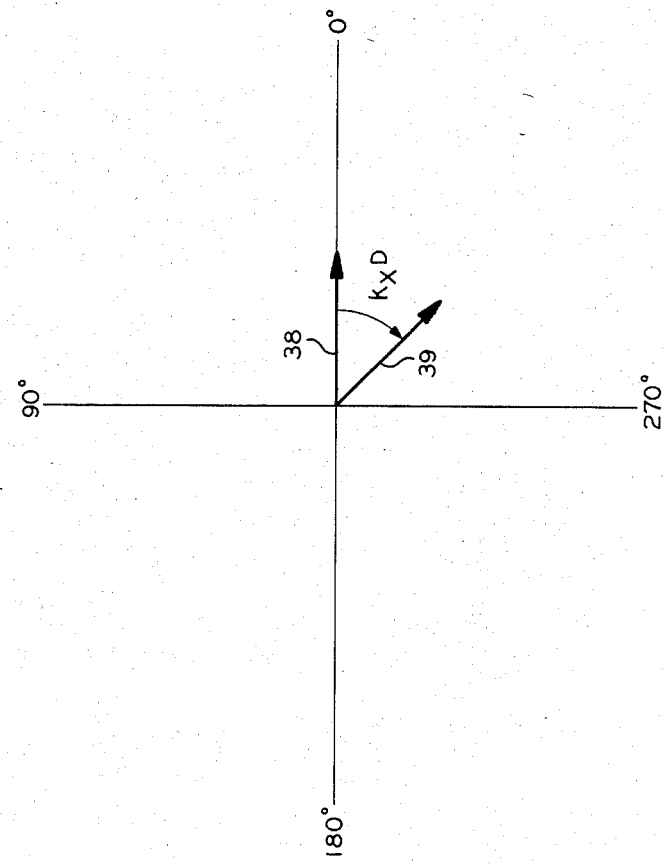
FIG. 5 is a phasor illustration of the signals which would be received by the receiver 36 illustrated in FIG. 4.

A phasor illustration of the signals which would be received by the receiver 36 is illustrated in FIG. 5. Phasor 38 is representative of the signal received from source 31. In like manner, phasor 39 is representative of the signal received from source 32. It is assumed that all of the received signals have the same magnitude but, as is illustrated in FIG. 5, the received signals would have different phases which are illustrated as angles in the phasor representation of FIG. 5.

Figure 6:
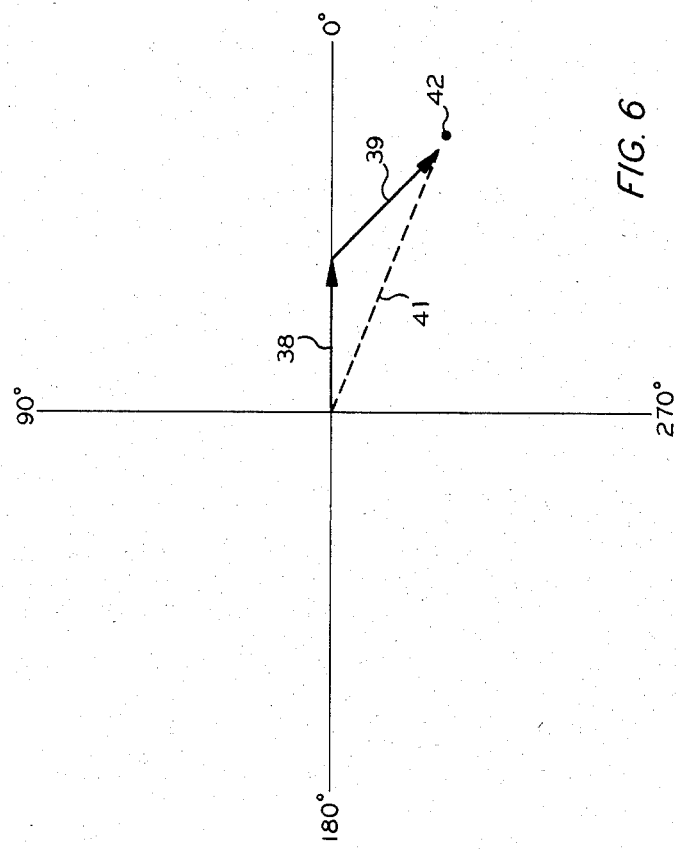
FIG. 6 is a phasor summation of the received signals illustrated in FIG. 5.

A phasor summation of the received signals 38 and 39, which are illustrated in FIG. 5, is illustrated in FIG. 6. It can again be seen that the resultant phasor 41 has a significantly larger magnitude than any one of the phasors 38 and 39. However, if a phase offset of $-k_x D$ were applied to the wavefront 34 illustrated in FIG. 4, then the resultant phasor provided by the summation of the signals received by receiver 36 would extend to point 42 illustrated in FIG. 6. The summation of the signals received by the receiver 36 would have a greater magnitude and would be enhanced with respect to the summation of the received signals without a phase shift. It is noted that the summation of signals would be automatic for the receiver 36 in that receiver 36 would provide an output signal representative of the total received signal strength with that total received signal strength being the resultant phasor 41 illustrated in FIG. 6.

Figure 7:
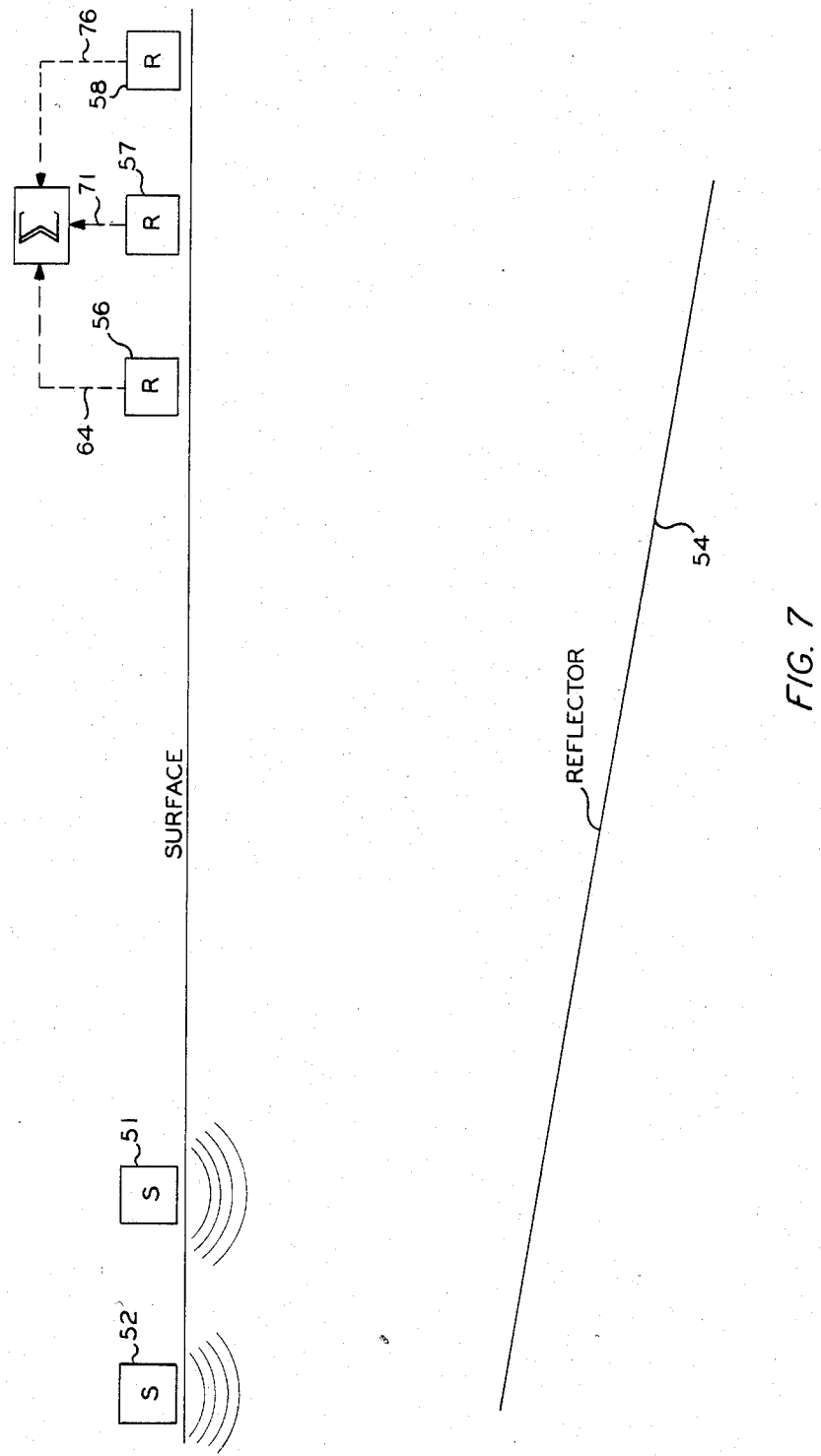
FIG. 7 is a general representation of a typical seismic exploration scene.

Referring now to FIG. 7, there is illustrated a small portion of a typical seismic exploration scene in which two seismic sources 51 and 52 are producing wavefronts which propagate through the earth, are reflected from the reflector 54 and received by the seismic receivers 56-58. The outputs from the seismic receivers 56-58 are summed to provide a composite output.

Figure 8:
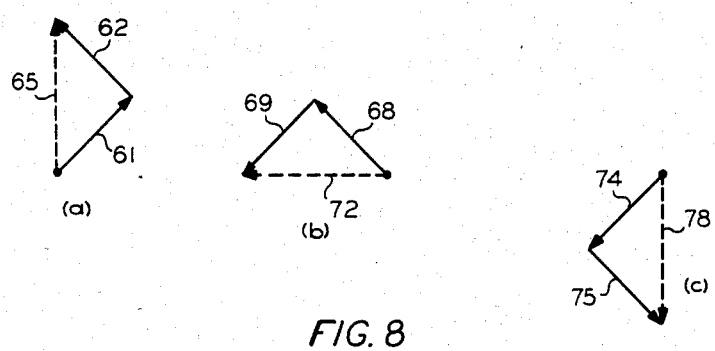
FIG. 8 is a phasor illustration of the signals received by the receivers illustrated in FIG. 7 when phase shifting is not applied.

Referring now to FIG. 8, the signals received by receiver 56 could be as illustrated in FIG. 8 (a) where phasor 61 is the signal received from source 51 and phasor 62 is the signal received from source 52. The output signal 64 from the receiver 56 would thus have the magnitude of the resultant phasor 65 illustrated in FIG. 8 (a).

In like manner, the signals received by the receiver 57 might be as illustrated in FIG. 8 (b) in which phasor 68 is contributed by source 51 and phasor 69 is contributed by source 52. Again, the output signal 71 from the receiver 57 would have the magnitude of the resultant phasor 72 illustrated in FIG. 8 (b).

Also, the signals received by receiver 58 might be as illustrated in FIG. 8 (c) in which the phasor 74 is contributed by source 51 and the phasor 75 is contributed by source 52. The output signal 76 from the receiver 58 would thus have the magnitude of the resultant phasor 78 illustrated in FIG. 8 (c).

If signals 64, 71 and 76 were summed in the manner suggested by FIG. 3, the result would be a phasor having the magnitude of phasor 72 since phasors 65 and 78 would cancel. This is an extreme case where two of the received signals are 180° out of phase but it does illustrate the effect of the received signals being out of phase.

Figure 9:
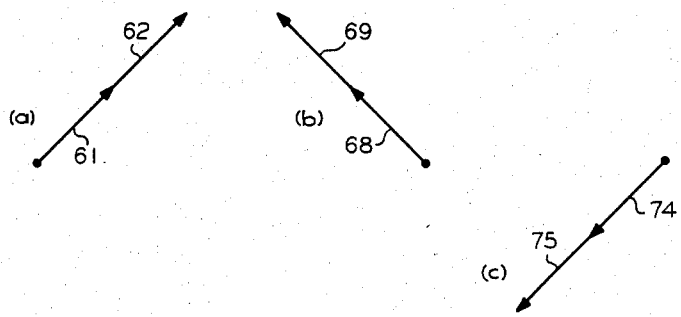
FIG. 9 is a phasor illustration of the signals received by the receivers illustrated in FIG. 7 if phase shifting is applied.

If the wavefront provided from the source 52 were shifted 90° in phase, signal 64 would have the magnitude of the sum of signals 61 and 62 illustrated in FIG. 9 (a), signal 71 would have the magnitude of the sum of signals 68 and 69 illustrated in FIG. 9 (b) and signal 76 would have the magnitude of the summation of signals 74 and 75 illustrated in FIG. 9 (c). If these received signals were summed, signals 64 and 76 would again cancel but the result of the summation would be the sum of signals 68 and 69 illustrated in FIG. 9 (b) which would be substantially greater than the magnitude of the resultant phasor 72 illustrated in FIG. 8 (b).

If the signal illustrated in FIG. 9 (a) was shifted 180° and the signal illustrated in FIG. 9 (b) was shifted 90° such that the phase angle of signals 64, 71 and 76 were equal, it can be seen that the summation of signals 64, 71 and 76 would be greatly increased over the magnitude of the resultant phasor 72 illustrated in FIG. 8 (b).

It is thus an object of this invention to provide method and apparatus for enhancing the summation of data received at a plurality of seismic receivers from a plurality of seismic sources by phase shifting both the waveform transmitted from the seismic sources and the signals provided as outputs from the plurality of seismic receivers.

In accordance with the present invention, method and apparatus is provided for phase shifting waveforms provided from a plurality of seismic sources so as to maximize the strength of signals received by a plurality of seismic receivers and for phase shifting the signals output from the plurality of seismic receivers so as to substantially maximize the strength of the composite signal which results from the summation of the output from the plurality of seismic receivers. In this manner, the effect of interference and noise on the interpretation of the composite signal are substantially reduced and a much more accurate interpretation may be obtained because of the increased signal strength of the composite signal.

Figure 10:
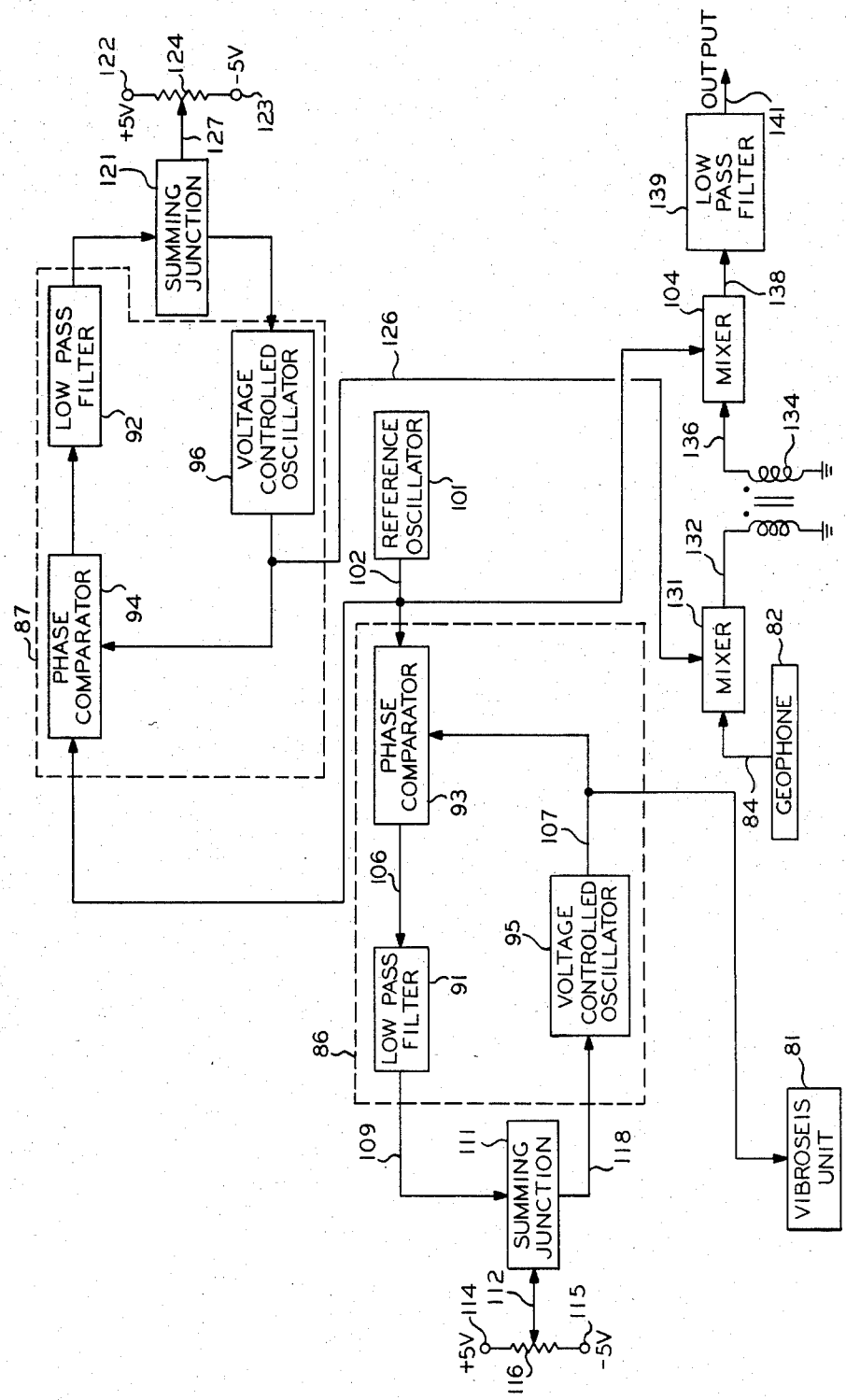
FIG. 10 is an illustration of the circuitry used in the present invention to enhance the summation of data received at a plurality of seismic receivers from a plurality of seismic sources.

Other objects and advantages of the invention will be apparent from the foregoing brief description of the invention and the claims as well as the detailed description of FIG. 10.

Referring now to FIG. 10, there is illustrated a Vibroseis ® unit 81. While the invention is particularly applicable to use with Vibroseis ® because of the controllability of a Vibroseis ® unit, the invention could also be utilized with other seismic sources such as an air gun to control the time when impulses are imparted from an air gun.

Also illustrated in FIG. 10 is a geophone 82. In water, the seismic receiver would typically be a hydrophone and other types of seismic receivers could be utilized if desired.

If it is assumed that the Vibroseis ® unit 81 illustrated in FIG. 10 corresponds to the source 52 illustrated in FIG. 7 it would be desirable to add a phase shift to the waveform provided from the Vibroseis ® unit 81 so as to enhance the strength of the signals received by receivers 56–58 illustrated in FIG. 7. Also, if it is assumed that the geophone 82 corresponds to the receiver 57 illustrated in FIG. 7, it would also be desirable to add a phase shift to the output signal 84 from the geophone 82 so as to substantially maximize the summation of the output signals 64, 71 and 76 illustrated in FIG. 7. It will further be assumed that it is desired to add a phase shift of $\phi_1$ to the waveform provided from the Vibroseis ® unit 81 and to add a phase shift of $\phi_2$ to signal 84.

Two phase lock loops 86 and 87 are illustrated in FIG. 10. The low pass filters 91 and 92, phase comparators 93 and 94 and voltage controlled oscillators 95 and 96 are each well known components of a phase lock loop. The theory of operation of a phase lock loop is well known and will not be discussed in detail except to the extent necessary to facilitate an understanding of the operation of the circuit illustrated in FIG. 10.

The reference oscillator 101 provides an output signal 102 which is utilized to provide a reference signal to the phase comparators 93 and 94 and which is also utilized to provide an input signal to the mixer 104. Signal 102 will be assumed to have a frequency of $\Omega$. Typically, the frequency of signal 102 would be low and would generally be in the range of about 10 Hz to about 120 Hz.

In a standard phase lock loop configuration, the output signal 106, from the phase comparator 93, would be provided directly through the low pass filter 91 to the voltage controlled oscillator 95. The output signal 107 from the voltage controlled oscillator 95 would be provided to the phase comparator 93. Since signal 106 is proportional to the phase difference between signals 102 and 107, the output signal 107 from the voltage controlled oscillator would be forced to lock on the frequency of signal 102 and, at steady-state, the frequency of signal 107 would be equal to $\Omega$ and would have the form $\cos \Omega t$, together with some phase shift.

In the present invention, the output signal 106 from the phase comparator 93 is passed through the low pass filter 91 and is provided as signal 109 to the summing junction 111 which may be an operational amplifier or other suitable device. The summing junction 111 is also provided with a DC voltage signal 112 from the combination of the +5 volt power supply 114, the −5 volt power supply 115 and the potentiometer 116. Signal 112 is summed with signal 109 to provide signal 118 to the input of the voltage controlled oscillator 95. The addition of signal 112 to signal 109 forces the output signal 107 from the voltage controlled oscillator to assume the form $$\cos \Omega t + \phi_1 \tag{8}$$

where it is assumed that the magnitude of the DC voltage level is such as to provide a phase shift of $+\phi_1$.

Signal 107 is provided as the controlling signal to the Vibroseis ® unit 81. The Vibroseis ® unit 81 operates to impart waves into the earth based on the frequency of signal 107 as is well known to those skilled in the art of seismic exploration using Vibroseis ® units. Signal 107 has the desired phase shift $\phi_1$ and thus the waves imparted from the Vibroseis ® unit 81 would also have the desired phase shift $\phi_1$.

The phase lock loop 87 together with the summing junction 121, the +5 volt power supply 122, the −5 volt power supply 123 and the potentiometer 124 act in the same manner as previously described for the phase lock loop 86, the summing junction 111, the +5 volt power supply 114, the −5 volt power supply 115 and the potentiometer 116 to establish signal 126 which has the form $$\cos \Omega t + \phi_2 \tag{9}$$

if it is again assumed that the DC signal 127 has a magnitude which would result in a phase shift of $+\phi_2$. Signal 126 is provided as an input to the mixer 131 as is signal 84 from the geophone 82.

As has been previously stated, signal 84 from the geophone 82 will have the form of equation (8) as modified by an additional phase shift arising from the effects of seismic propagation and reflection. However, for the sake of simplifying the following math, it will be assumed that signal 84 does not have a phase shift and is of the form of equation (6). The principle of adding a phase shift to signal 84 would be the same whether or not signal 84 has a phase angle other than zero.

The mixer 131 multiplies signals 84 and 126 to establish an output signal 132 which has the form $$\tfrac{1}{2}\{\cos [(\Omega+\Omega)t+\phi_2]+\cos [(\Omega-\Omega)t+\phi_2]\} \tag{10}$$

It can be seen that the difference frequency component of equation (10) is 0 Hz. The DC (i.e. 0 Hz) portion of the signal represented by equation (10) can be filtered out in many different ways. A transformer coupling network 134 is utilized in the present invention. Thus, signal 136 which is provided from the transformer coupling network to the mixer 104 has the form $$\tfrac{1}{2}(\cos 2\Omega t+\phi_2) \tag{11}$$

Signal 136 is multiplied by signal 102 in the mixer 104 to establish signal 138 which has the form $$\tfrac{1}{4}[(\cos 3\Omega t+\phi_2)+(\cos \Omega t+\phi_2)]. \tag{12}$$

Signal 138 is passed through the low pass filter 139 to remove the high frequency ($3\Omega$) term and establish signal 141 which will have the form $$\tfrac{1}{4}(\cos \Omega t+\phi_2) \tag{13}$$

which is the desired result.

It is noted that amplification may be utilized to compensate for the fact that the mixers are reducing the signal amplitude.

In a typical seismic exploration system which utilizes a plurality of sources and a plurality of receivers, each source would have a phase lock loop and associated circuitry associated therewith and also each receiver would have a phase lock loop together with the mixing and filtering circuitry associated therewith. A single reference oscillator could be utilized for all sources and all receivers. The reference oscillator could take the form of a radio transmission which is demodulated or other similar form which would typically be used in seismic exploration system which are spread out over large distances.

Particular advantages to the circuitry illustrated in FIG. 10 in addition to the phase shifting which enhances the magnitude of a composite waveform are as follows:

1. The reference oscillator is common for all source and receiver elements which results in improved stabilities since any change in the frequency of the reference oscillator affects all elements equally and performance will not be degraded.

2. The circuitry results in less stringent filter requrements since the use of the same reference frequency for both the sources and receivers results in a DC component in signal 132 which can be removed by transformer coupling and also, for low frequencies, the third harmonic would be easily filtered from the first harmonic which is occurring in the low pass filter 139.

The potentiometers 116 and 124 were illustrated as a means for providing a bias signal to the summing junctions 111 and 121 for the sake of convenience. Typically, a programmable voltage supply would be utilized to provide the bias signal to the summing junctions. Thus, a signal transmitted by radio or by wire could be utilized to determine both the frequency of signal 102 and the voltage level for the bias signals. Essentially, the voltage level of the bias signal would be a function of the digital address transmitted from a central control station to the circuitry illustrated in FIG. 10. Thus, the phase shift for both the seismic sources and the seismic receivers could be changed as desired by changing the digital address transmitted.

A typical programmable power supply which could be utilized is Model LES-EE-01-OV, Lamda Electronics, Melville, N.Y.

The circuitry illustrated in FIG. 10 has been described in terms of blocks which are familiar to those involved in signal processing. Specific designs and examples of the blocks illustrated in FIG. 10 may be found in a number of references. Two specific references are: Terman, Frederick Emmons, *Radio Engineer's Handbook*, McGraw-Hill Book Company, Inc., 1943 and ITT, *Reference Data for Radio Engineers*, 5th Edition, Howard V. Sams and Co., Inc., 1969. Also, phase lock loops and the operation thereof are described very completely in the Applications Book published by Signetics Corp. (1974).

In summary, the circuitry illustrated in FIG. 10 may be utilized to apply a phase shift to both the wavefront induced in the earth by a plurality of seismic sources so as to substantially maximize the signal strength seen by a plurality of geophones and the output signals from a plurality of geophones can be phase shifted so as to maximize the magnitude of a composite output signal. The use of a common reference oscillator for all sources and receivers to accomplish the desired phase shift is a particular advantage of the circuitry illustrated in FIG. 10.

Additional electronic components such as conventional interfacing circuitry and control circuitry have not been illustrated since these additional components play no part in the description of the present invention. A particular seismic exploration system which could be utilized to provide the reference oscillator frequency 102 and to provide the control of the bias signals provided from programmable power supplies is the Opseis ® 5500 Seismic Exploration System manufactured by Applied Automation, Inc., Bartlesville, Okla.

While the invention has been described in terms of the presently preferred embodiment, reasonable variations and modifications are possible by those skilled in the art and such modifications and variations are within the scope of the described invention and the appended claims.

That which is claimed is:

1. Apparatus comprising:

a plurality of seismic sources;

a plurality of seismic receivers;

a first phase comparator having first and second inputs and an output;

means for providing a reference signal having the form cos $\Omega t$ to the first input of said first phase comparator, wherein $\Omega$ is the frequency of said reference signal;

a first voltage controlled oscillator having an input and an output;

means for providing an output signal from the output of said first voltage controlled oscillator to the second input of said first phase comparator, wherein said first phase comparator establishes a first signal which is proportional to the phase difference between said reference signal and the output signal from said first voltage controlled oscillator;

means for combining a first DC voltage with said first signal to produce a first combined signal;

means for providing said first combined signal to the input of said first voltage controlled oscillator, wherein the output signal from said first voltage controlled oscillator has the form cos $(\Omega t + \phi_1)$ and wherein $\phi_1$ is a phase angle which is determined by the magnitude of said first DC voltage;

means for controlling a first one of said plurality of seismic sources in response to the output signal from said first voltage controlled oscillator, wherein the phase angle of the wavefront induced into the earth by said first one of said plurality of seismic sources is $\phi_1$, wherein the magnitude of said first DC voltage is chosen so as to produce a wavefront from said first one of said plurality of seismic sources which has a phase angle, as seen by one of said plurality of receivers, substantially equal to the phase angle, as seen by the same one of said plurality of receivers, of the wavefront produced by the one of said plurality of seismic sources which is selected as a reference seismic source, wherein a wavefront from each one of said plurality of seismic sources is received by each one of said plurality of seismic receivers and wherein a first one of said seismic receivers provides an output signal having the form cos $\Omega t + \phi_2$ where $\phi_2$ is the phase angle, as seen by said first one of said seismic receivers, of the wavefront produced by said reference seismic source;

a second phase comparator having first and second inputs and an output;

means for providing said reference signal to the first input of said second phase comparator;

a second voltage controlled oscillator having an input and an output;

means for providing an output signal from the output of said second voltage controlled oscillator to the second input of said second phase comparator, wherein said second phase comparator establishes a second signal which is proportional to the phase difference between said reference signal and the output signal from said second voltage controlled oscillator;

means for combining a second DC voltage with said second signal to produce a second combined signal;

means for providing said second combined signal to the input of said second voltage controlled oscillator, wherein the output signal from said second voltage controlled oscillator has the form $\cos(\omega t + \phi_3)$ and wherein $\phi_3$ is a phase angle which is determined by the magnitude of said second DC voltage;

a first mixer having first and second inputs and an output;

means for providing the output signal from said first one of said plurality of seismic receivers to the first input of said first mixer;

means for providing the output signal from said second voltage controlled oscillator to the second input of said first mixer, wherein said first mixer establishes a third signal which is representative of the result of mixing the output signal from said second voltage controlled oscillator and wherein said third signal has a DC component and a component having a frequency of $2\Omega$;

means for removing a DC component from a signal;

a second mixer having first and second inputs and an output;

means for providing said third signal from the output of said first mixer through said means for removing a DC component from a signal to the first input of said second mixer;

means for providing said reference signal to the second input of said second mixer, wherein said second mixer establishes a fourth signal representative of the result of mixing the $2\Omega$ component of said third signal and said reference signal;

a low pass filter; and means for passing said fourth signal through said low pass filter to establish a fifth signal which has the form of a phase shifted signal having a frequency of $\Omega$, wherein the magnitude of said second DC voltage is chosen so as to apply a phase shift to the output signal from said first one of said plurality of seismic receivers which will make the phase angle of said fifth signal substantially equal to the phase angle of the output signal from the one of said seismic receivers which is selected as a reference receiver.

2. Apparatus in accordance with claim 1 wherein a phase shift is applied to the signal controlling each one of said plurality of seismic sources in addition to said first one of said seismic sources in such a manner that the wavefront provided from each one of said plurality of seismic sources has a phase angle which will make the phase angle of all wavefronts received by each one of said plurality of seismic receivers substantially equal and wherein a phase shift is applied to the output signal from each one of said plurality of seismic receivers in addition to said first one of said seismic receivers in such a manner that the phase angle of the output signals from said plurality of seismic receivers are substantially equal.

3. A method for phase shifting a waveform provided from a first one of a plurality of seismic sources and for phase shifting the signal output from a first one of a plurality of seismic receivers, said method comprising the steps of:

providing a reference signal having the form $\cos \Omega t$ to the first input of a first phase comparator, having first and second inputs and an output, wherein $\Omega$ is the frequency of said reference signal;

providing an output signal from the output of a first voltage controlled oscillator, having an input and an output, to the second input of said first phase comparator, wherein said first phase comparator establishes a first signal which is proportional to the phase difference between said reference signal and the output signal from said first voltage controlled oscillator;

combining a first DC voltage with said first signal to produce a first combined signal;

providing said first combined signal to the input of said first voltage controlled oscillator, wherein the output signal from said first voltage controlled oscillator has the form $\cos(\Omega t + \phi_1)$ and wherein $\phi_1$ is a phase angle which is determined by the magnitude of said first DC voltage;

controlling said first one of said plurality of seismic sources in response to the output signal from said first voltage controlled oscillator, wherein the phase angle of the wavefront induced into the earth by said first one of said plurality of seismic sources is $\phi_1$, wherein the magnitude of said first DC voltage is chosen so as to produce a wavefront from said first one of said plurality of seismic sources which has a phase angle, as seen by one of said plurality of receivers, substantially equal to the phase angle, as seen by the same one of said plurality of receivers, of the wavefront produced by the one of said plurality of seismic sources which is selected as a reference seismic source, wherein a wavefront from each one of said plurality of seismic sources is received by each one of said plurality of seismic receivers and wherein said first one of said seismic receivers provides an output signal having the form $\cos \Omega t + \phi_2$ where $\phi_2$ is the phase angle, as seen by said first one of said seismic receivers, of the wavefront produced by said reference seismic source;

providing said reference signal to the first input of a second phase comparator having first and second inputs and an output;

providing an output signal from the output of a second voltage controlled oscillator, having an input and an output, to the second input of said second phase comparator, wherein said second phase comparator establishes a second signal which is proportional to the phase difference between said reference signal and the output signal from said second voltage controlled oscillator;

combining a second DC voltage with said second signal to produce a second combined signal;

providing said second combined signal to the input of said second voltage controlled oscillator, wherein the output signal from said second voltage controlled oscillator has the form $\cos(\Omega t + \phi_3)$ and wherein $\phi_3$ is a phase angle which is determined by the magnitude of said second DC voltage;

mixing the output signal from said first one of said plurality of seismic receivers with the output signal from said second voltage controlled oscillator to establish a third signal, wherein said third signal has a DC component and a component having a frequency of $2\Omega$;

removing the DC component from said third signal to establish a fourth signal;

mixing said fourth signal and said reference signal to establish a fifth signal; and passing said fifth signal through a low pass filter to establish a sixth signal which has the form of a phase shifted signal having a frequency of $\Omega$, wherein the magnitude of said second DC voltage is chosen so as to apply a phase shift to the output signal from said first one of said plurality of seismic receivers which will make the phase angle of said fifth signal substantially equal to the phase angle of the output signal from the one of said seismic receivers which is selected as a reference receiver.

4. A method in accordance with claim 3 wherein a phase shift is applied to the signal controlling each one of said plurality of seismic sources in addition to said first one of said seismic sources in such a manner that the wavefront provided from each one of said plurality of seismic sources has a phase angle which will make the phase angle of all wavefronts received by each one of said plurality of seismic receivers substantially equal and wherein a phase shift is applied to the output signal from each one of said plurality of seismic receivers in addition to said first one of said seismic receivers in such a manner that the phase angle of the output signals from said plurality of seismic receivers are substantially equal and wherein the output signals from said plurality of seismic receivers are summed to produce said composite signal.

* * * * *

UNITED STATES PATENT AND TRADEMARK OFFICE
CERTIFICATE OF CORRECTION

PATENT NO. : 4,500,976

DATED : February 19, 1985

INVENTOR(S) : Richard E. DuBroff

It is certified that error appears in the above-identified patent and that said Letters Patent is hereby corrected as shown below:

Column 9, claim 1, line 19, "wt" should be ---$\Omega t$---.

Signed and Sealed this

Seventeenth Day of September 1985

[SEAL]

Attest:

Attesting Officer

DONALD J. QUIGG

Commissioner of Patents and Trademarks—Designate